United States Patent [19]

Mori

[11] Patent Number: 4,688,887

[45] Date of Patent: Aug. 25, 1987

[54] CONNECTING STRUCTURE FOR AN OPTICAL CONDUCTOR TUBE

[76] Inventor: Kei Mori, 3-16-3-501, Kaminoge, Setagaya-ku, Tokyo, Japan

[21] Appl. No.: 722,895

[22] Filed: Apr. 12, 1985

[30] Foreign Application Priority Data

May 2, 1984 [JP] Japan .................................. 59-88933
Aug. 8, 1984 [JP] Japan ................................ 59-166081

[51] Int. Cl.⁴ .............................................. G02B 6/38
[52] U.S. Cl. ............................. 350/96.21; 350/96.20
[58] Field of Search ............... 350/96.20, 96.21, 96.22

[56] References Cited

U.S. PATENT DOCUMENTS 4,563,057 1/1986 Ludman et al. ............. 350/96.21 X
4,588,257 5/1986 Maranto .......................... 350/96.21

*Primary Examiner*—Eugene R. LaRoche
*Assistant Examiner*—James C. Lee
*Attorney, Agent, or Firm*—Jordan and Hamburg

[57] ABSTRACT

A connecting structure for an optical conductor tube having an optical conductor rod inserted in a pipe to connect it vertically and in cascade fashion with another optical conductor tube and also having an inserted optical conductor rod. A transparent spacer of a diameter approximately equal to that of the optical conductor rods is interposed between them and the circumferential portion of the spacer has arc-shaped notches at a plurality of locations thereon. The notches have a transparent support arm engaged therewith and are elongated toward the pipe. The support arm is fixed clippingly by the flange.

12 Claims, 16 Drawing Figures

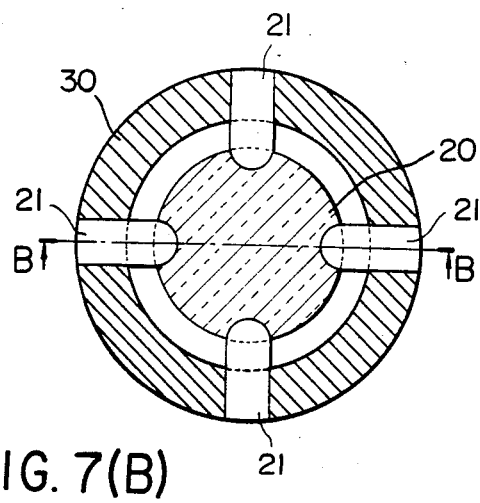
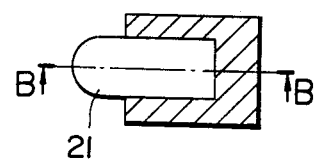
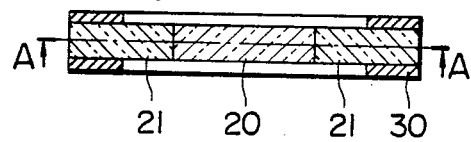
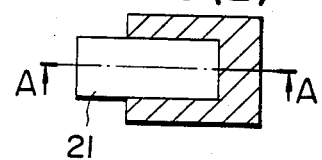
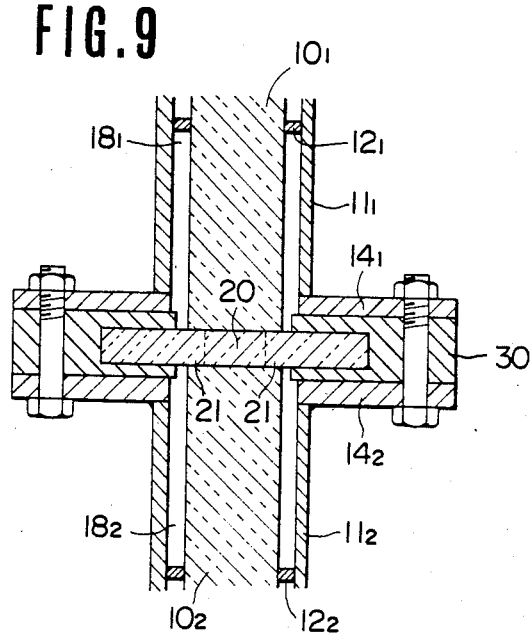

CONNECTING STRUCTURE FOR AN OPTICAL CONDUCTOR TUBE

BACKGROUND OF THE INVENTION

The present invention relates to a connecting structure for an optical conductor tube which transmits light energy.

The present applicant has previously proposed various ways for guiding solar rays focused by a lens or the like into an optical conductor for transmitting solar rays therethrough onto an optional desired place for use in illumination or for other purposes. However, in general, an optical conductor cable is used for conducting the light rays and it is very expensive. Therefore, in order to lower the cost thereof, an optical conductor rod (a quartz rod) was chosen. The optimal length of the optical conductor rod is about 4 m in consideration of transportability and operating efficiency. In practice it is necessary to employ a plurality of optical conductor rods connected with each other. Usually the outer surface of optical conductor rods are not protected or coated. For this reason the outer surface thereof is apt to get damaged and therefore light rays tend to leak from the damaged portion of the optical conductor rod. Also if dust or the like are allowed to be on the outer surface of the optical conductor rod, light rays leak therefrom. In this case the optical conductor rod is protected by means of a pipe or the like for preventing light rays from leaking therefrom.

However, in practice, a solar ray collecting device is installed on the rooftop of a building and solar rays focused by a solar ray collecting device are guided through an optical conductor tube having an optical conductor rod protected by a pipe onto each floor of the building or to an underground area. On that occasion, it is necessary to connect a large number of optical conductor tubes vertically and in cascade fashion and the optical conductor rod in the pipe is apt to slide down in the pipe by the sheer weight thereof.

SUMMARY OF THE INVENTION

It is an object of the present invention to effectively connect optical conductor rods which are protected by pipes.

It is another object of the present invention to protect the contact surface of the optical conductor rod from external forces such as vibrations and extending in the direction of its axis.

It is an object of the present invention to prevent the optical conductor rod, which is protected by a pipe, from falling down when a large number of optical conductor tubes are connected together vertically and in cascade fashion.

It is another object of the present invention to soften the action of external forces acting on an optical conductor rod.

The above-mentioned features and other advantages of the present invention will be apparent from the following detailed description which goes with the accompanying drawings.

BRIEF DESCRIPTION OF THE DRAWINGS

FIG. 7(A) is a plan view and cross-sectional view taken along line A—A of FIG. 7(B) and showing another embodiment of a unitarily constructed spacer, support arm, and packing;

FIG. 7(B) is a cross-sectional view taken along the line B—B in FIG. 7(A);

FIG. 8(A) is a plan view and a cross-sectional side view taken along the line A—A in FIG. 8(B) and showing another embodiment in relation to the support arm and the packing;

FIG. 8(B) is a cross-sectional view taken along the line B—B in FIG. 8(A);

FIG. 9 is a cross-sectional side view of another embodiment of the present invention.

DESCRIPTION OF THE PREFERRED EMBODIMENTS

Figure 1:
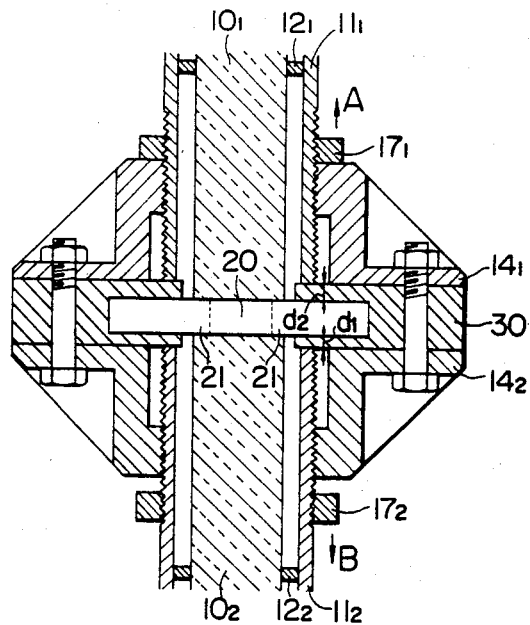
FIG. 1 is a cross-sectional side view for explaining an embodiment of a connecting structure for an optical conductor tube according to the present invention.

FIG. 1 is a cross-sectional construction view for explaining an embodiment of the present invention. In FIG. 1, $10_1$ and $10_2$ are optical conductor rods, $11_1$ and $11_2$ are protective pipes for protecting respectively the optical conductor rods $10_1$ and $10_2$ from external damage, dust, etc., and $12_1$ and $12_2$ are support members for supporting respectively the optical conductor rods $10_1$ and $10_2$ in the protective pipes $11_1$ and $11_2$. A member for preventing the light rays from leaking out of the support members is provided in them as proposed by the present applicant.

Figure 3:
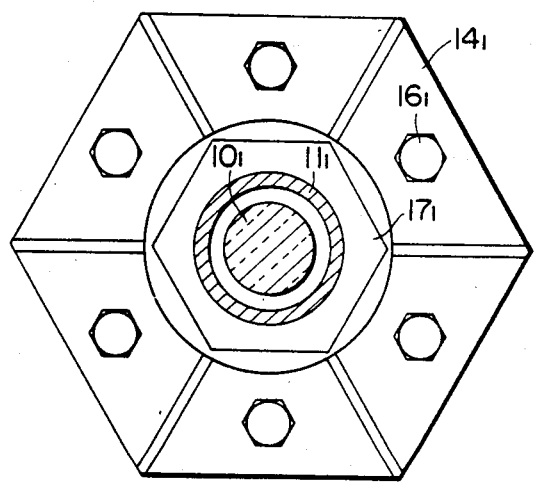
FIG. 3 is a view as seen from line III—III of FIG. 2.
Figure 2:
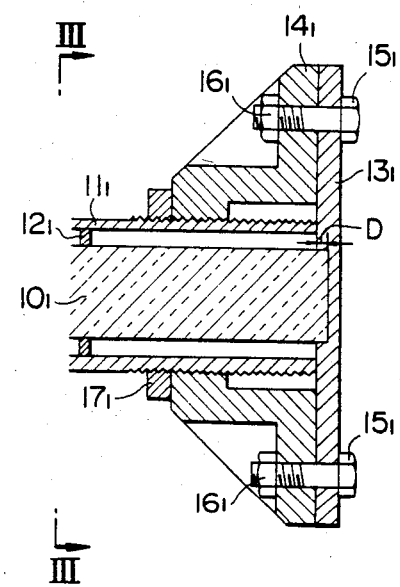
FIG. 2 is a cross-sectional side view of the optical conductor tube's edge portion.

FIG. 2 is a cross-sectional construction view of the optical conductor rod $10_1$ side which is not connected with another optical conductor rod $10_2$. FIG. 3 is the view seen from line III—III of FIG. 2. As mentioned before, the optical conductor rod $10_1$ is accommodated in a protective pipe $11_1$ by means of a support member $12_1$. Since the optical conductor rod and the protective pipe are unitarily constructed, the combination thereof will be called "an optical conductor tube", hereinafter.

However, in the above-mentioned optical conductor tube, if the edge portion of the optical conductor rod is kept open, as it actually is, dust or the like is apt to reach the edge surface of it or to be damaged. In order to prevent such problems, the edge portion of the optical conductor tube is closed by means of a protective plate. Namely, in FIGS. 2 and 3, $13_1$ is a protective plate for covering the edge portion of the optical conductor tube, and $14_1$ is a flange screwingly fixed to the pipe $11_1$. The protective plate $13_1$ is mounted on the flange $14_1$ by means of bolts $15_1$ and nuts $16_1$ so as to cover the edge surface of the optical conductor tube.

Moreover, a nut $17_1$ is fixedly screwed to the pipe $11_1$, and the flange $14_1$ is prevented from rotating around the pipe $11_1$ by fastening the nut $17_1$ against the flange $14_1$. And, the flange $14_1$ is constructed in the shape of a hexagon as shown in FIG. 3. In such a construction, the optical conductor tube is not rotated at the time of conveyance. The edge surface of the optical conductor rod $10_1$ projects from the edge surface of the pipe $11_1$, and an elastic packing is interposed therebetween D.

The present invention relates to a connecting structure for connecting an optical conductor tube constructed as described above. At the time of the connection, the protective plate $13_1$ is removed from the flange $14_1$. Another protective plate at the optical conductor rod $10_2$ side is also removed in a similar way. After removing the protective plate as mentioned above, the optical conductor rod is connected with another one.

On that occasion, if a large number of optical conductor tubes are connected with each other vertically and in cascade fashion for instance, a support relationship exists between the optical conductor rod $10_1$ and the pipe $11_1$ and the optical conductor rod $10_1$ slides down from the pipe $11_1$, the weight of the optical conductor rod $10_1$ is applied to the optical conductor rod $10_2$. For this reason, the support relationship between the optical conductor rod $10_2$ and the pipe $11_2$ is broken. Afterward, in a similar way, the support relationship of the optical conductor rod and the pipe is broken, and the optical conductor rod falls down instantly.

The present invention was created in order to solve the above-mentioned problem. According to the present invention, even though the support relationship between the optical conductor rod $10_1$ and the pipe $11_1$ is broken, the gravity of the upper-side optical conductor rod $10_1$ is not applied to the lower-side optical conductor rod $10_2$.

Figure 4A:
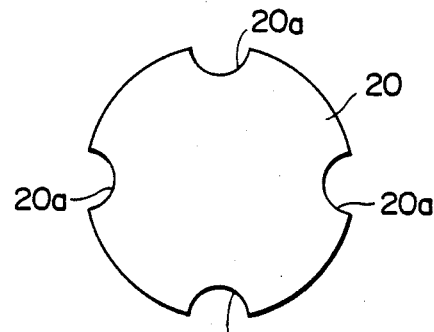
FIGS. 4(A) and 4(B) are a cross-sectional plan view and a cross-sectional side view respectively of the spacer according to the present invention.
Figure 4B:
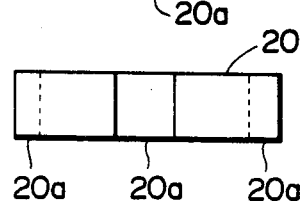

FIG. 4(A) is a plan view and FIG. 4(B) is a side view showing an embodiment of a spacer according to the present invention.

Figure 5A:
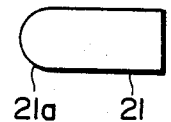
FIGS. 5(A) and 5(B) are a cross-sectional plan view and a cross-sectional side view respectively of the support arm.
Figure 5B:
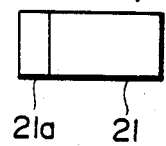

FIG. 5(A) is a plan view and FIG. 5(B) is a side view showing a support arm. In FIGS. 4(A), 4(B), 5(A) and 5(B), 20 is a transparent spacer having a diameter equal to that of the optical conductor rod and 21 is a transparent support arm which is preferably made of a similar material as that of the optical conductor rod.

Figure 6:
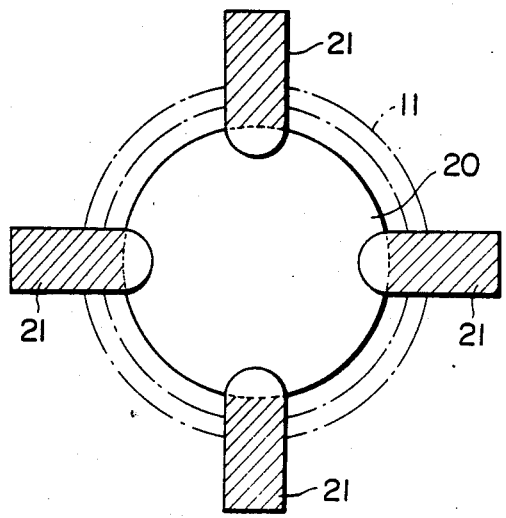
FIG. 6 is a plan view showing another embodiment of a unitarily constructed spacer and support arm.

A circumferential portion of the spacer 20 has arc-shaped notches 20a at a plurality of locations thereon. The support arm 21 has arc-shaped surfaces engaging with those notches and the thickness thereof is equal to that of the spacer 20. By letting the spacer 20 and the support arm 21, as mentioned above, engage with each other unitarily by use of an optical paste or the like as shown in FIG. 6 and joining the spacer and the optical conductor rod concentrically, a part of the support arm (an oblique line-portion) projects from the circumferential portion of the optical conductor rod. If this portion is supported by the pipe or the flange, the optical conductor rod can be supported by the support arm. Therefore, as mentioned above, even though the optical conductor rod is apt to slide down from the pipe at the upper optical conductor tube, the optical conductor can be supported by the support arm. As a result the optical conductor rod can be prevented from falling down therefrom.

Furthermore, as mentioned above, if the notched portion 20a of the spacer 21 is formed in an arc-shape, the treatment work becomes very easy and the finish of its surface can be done precisely. As a result, there is no diffused reflection. Since the spacer has no sharply angled portions, there is no fear of cracking or the like.

FIG. 1 is a cross-sectional view showing an embodiment of the present invention in the case of connecting two optical conductor tubes with each other through the spacer 20 and the support arm 21 as mentioned above. In FIG. 1, 30 is an elastic packing and a force applied to the support arm is softened by the packing 30. Furthermore, in the case of interposing the optical paste or the optical oil in a space between the engaging surfaces of the spacer and the optical conductor rod, dispersion of the light rays is minimized at the portion mentioned above and therefore the light rays propagating through the optical conductor rod can be transmitted to the next optical conductor rod with the least amount of loss.

An embodiment of the present invention has been described heretofore. However, the present invention is not limited to the above-mentioned embodiment only. An example of unitarily forming the spacer 20 and the supporting arm 21 by use of optical paste has been described heretofore. Otherwise, both the spacer 20 and the supporting arm 21 are formed individually. At the time of assembly or at the halfway point of the assembly process, the optical paste, the optical oil, etc. can be poured into a space between the joint surfaces of the spacer and the support arm.

Furthermore, the reflecting mirror treatment can be performed on the front surface of the portion protruding from the spacer 20 of the support arm 21. In such a manner, a part of the light rays entering the support arm 21 can be returned into the optical conductor rod and the transmission efficiency of light rays can be improved. Concerning the elastic packing for supporting the support arm 21, if the thickness of the lower packing is smaller than that of the upper packing, for instance, $d_1$ is smaller than $d_2$ ($d_1 < d_2$) as shown in FIG. 1, the displacement toward the lower portion of the support arm 21 turns out to be small when gravity is applied to the support arm 21, and the gravity can be effectively prevented from being transmitted to the lower optical conductor rod.

The case in which the optical paste, the optical oil, etc. are poured into a space between the edge surface of the lower optical conductor rod and the contact surface of the spacer and the support arm has been described heretofore. If an elastic material, for instance, a jellified optical packing is put in the above-mentioned portion, even though the support arm 21 receives the gravity and is displaced downward, the amount of displacement can be absorbed by the optical packing. Therefore, the lower optical conductor rod can be effectively prevented from going downward.

FIGS. 7(A) and 7(B) are cross-sectional views showing the relationship of the spacer 20, the support arm 21, and the packing 30. FIG. 7(A) is a cross-sectional plan view taken along line A—A of FIG. 7(B), and FIG. 7(B) is a cross-sectional side view taken along line B—B of FIG. 7(A). In the embodiment as shown in FIGS. 7(A) and 8(B), the packing 30 has a hole for inserting the support arm 21. The embodiment shows the case in which the support arm 21 is inserted in the hole, and the spacer 20, the support arm 21, and the packing 30 are unitarily assembled. Otherwise, they can also be constructed individually for assembly in the factory and for employing them.

FIGS. 8(A) and 8(B) are cross-sectional views showing the other embodiment of the support arm 21 and the packing 30. FIG. 8(A), (A) is a cross-sectional plan view taken along line A—A of FIG. 8(B), and FIG. 8(B) is a cross-sectional side view taken along line B—B of FIG. 8(A). In the embodiment, the packing 30 is constructed in a state of sack and each support arm 21 is inserted into the respective packings 30 for employing them.

FIG. 9 is a cross-sectional side view for explaining the other embodiment of the present invention. In FIG. 9, the same reference numeral as that of FIG. 1 is attached to the portion performing the same action as that of FIG. 1. However, in this embodiment, the protective pipe and the flange are unitarily constructed. As shown in FIG. 9, the flange $14_1$ is unitarily constructed at the edge portion of the protective pipe $11_1$, and flange $14_2$ is unitarily constructed with the protective pipe $11_2$. The spacer 20 and the support arm 21 are 21 are clippingly fixed between the flanges $14_1$ and $14_2$ as in the case of the former embodiment.

As is apparent from the foregoing description, the optical conductor rod can be prevented from sliding down from the pipe when connecting a large number of optical conductor tubes vertically and in cascade fashion. At the connecting portion, a part of the light rays propagating through the optical conductor rod leak outside through the support arm. In the present invention as compared with the case in which a single spacer of a larger diameter equal to the outer diameter of the support arm, the total dimension of the cross section of the support arm can be made smaller, and therefore the transmission loss can be lowered. Furthermore, since each of the connecting portions is elastic, it is a merit of the present invention to cause a softening of the action of an external force entirely.

Furthermore as the joint surfaces of the spacer and the support arm are formed in an arc-shaped manner, the treatment process of the spacer turns out to be very easy and the finishing process of the surface thereof can be performed precisely. Furthermore there is no diffused reflection of the light rays at the engagement surface and as a result light rays can be effectively transmitted. Furthermore, the spacer has no fear of crack or the like.

Figure 10:
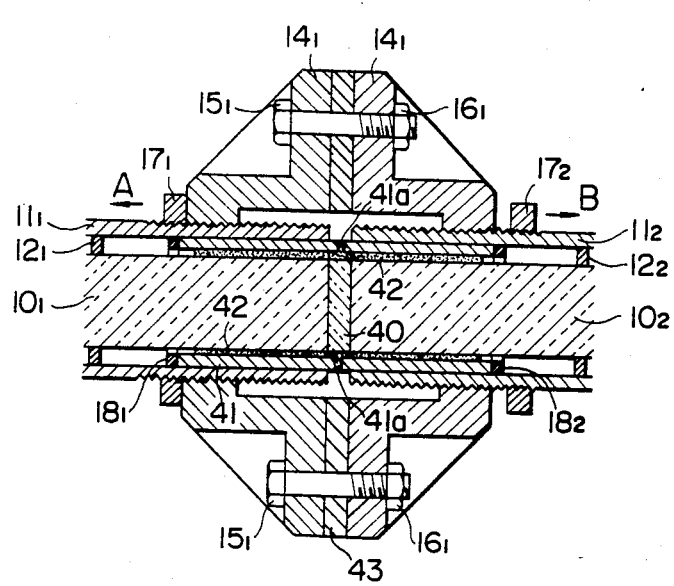
FIG. 10 is a side cross-sectional view for explaining another embodiment of a connecting structure for the optical conductor tube according to the present invention.

FIG. 10 is a cross-sectional view for explaining another embodiment of the present invention. In FIG. 10, $10_1$ and $10_2$ are optical conductor rods, $11_1$ and $11_2$ are protecting pipes for protecting respectively the optical conductor rods $10_1$ and $10_2$ from external damage, dust, etc., and $12_1$ and $12_2$ are support members for supporting respectively the optical conductor rods $10_1$ and $10_2$ placed inside the protective pipes $11_1$ and $11_2$. The support members are equipped to prevent the light rays from leaking out of the support members as proposed by the present applicant.

Figure 12:
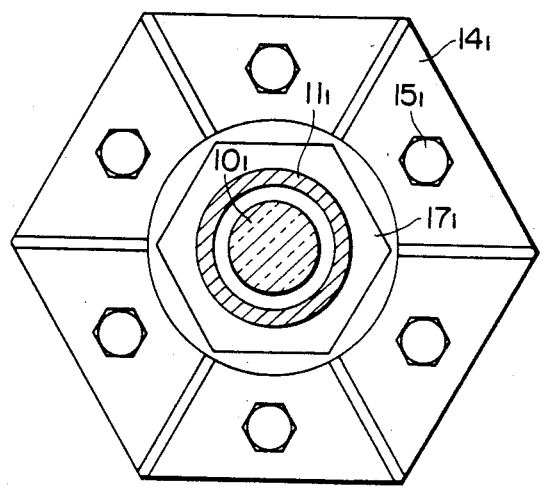
FIG. 12 is a view as seen from line XII—XII of FIG. 11.
Figure 11:
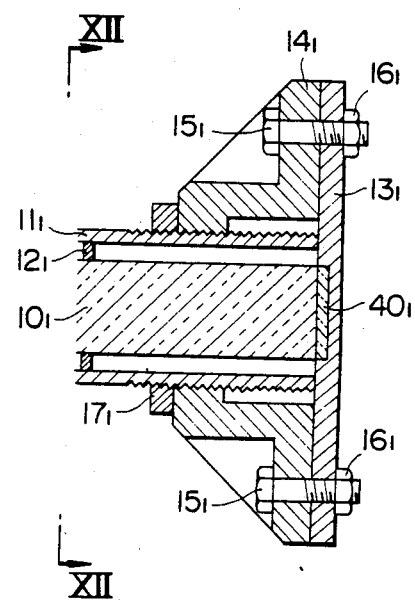
FIG. 11 is a side cross-sectional view of the optical conductor tube's edge portion.

FIG. 11 is a cross-sectional view of the optical conductor rod $10_1$ side which is not connected with another optical conductor rod $10_2$. FIG. 12 is a view as seen from line XII—XII of FIG. 11. As mentioned before, the optical conductor rod $10_1$ is accommodated in a protective pipe $11_1$ by means of the support member $12_1$.

However, in the case of the above-mentioned optical conductor tube, if the edge portion of the optical conductor rod is kept open as it usually is, dust and the like are apt to fall on the edge surface of it or it may be damaged. In order to solve such a problem, the edge portion of the optical conductor tube is closed off by the use of a protective plate. In FIGS. 11 and 12, $13_1$ is a protective plate for covering the edge portion of the optical conductor tube, and $14_1$ is a flange fixed to the pipe by a screw $11_1$. The protective plate $13_1$ is mounted on the flange $14_1$ by means of bolts $15_1$ and nuts $16_1$ so as to cover the edge surface of the optical conductor tube. Also a nut $17_1$ is fixed to the pipe $11_1$, by means of a screw and the flange $14_1$ is thereby prevented from rotating around the pipe $11_1$ by fastening the nut $17_1$ to the flange $14_1$. The flange $14_1$ is constructed in the shape of a hexagon as shown in FIG. 12. In such a way, the optical conductor tube is not rotated at the time of its conveyance. Furthermore optical jelly $40_1$ having a refractive index which is approximately equal to that of the optical conductor rod $10_1$ is provided in the space between the contact surface portions of the protective plate $13_1$ and the optical conductor rod $10_1$. In the present invention the optical jelly used is in a liquid state initially and later becomes a jelly after settling in place over a period of time. The side of optical conductor rod $10_2$ is constructed in quite the same way as optical conductor rod $10_1$.

The present invention relates to a connecting structure for connecting an optical conductor tube constructed as described above. At the time of the connection the protective plate $13_1$ is removed from the flange $14_1$. Another protective plate at the optical conductor rod $10_2$ side is also removed. After removing the protective plate, as mentioned above, the jelly $40_1$ is removed and optical paste 40 is then attached to the optical conductor rod. After that, for instance, the paste 40 is applied to the side of the optical conductor rod $10_1$, a spacer 41 is inserted between the optical conductor rod $10_1$ and the pipe $11_1$ until it impinges against a stopper $18_1$. The spacer 41 has a length which is about two times that from the edge surface of the optical conductor tube to the stopper. Opposite to the optical conductor tube at the side of the optical conductor rod $10_1$'s side having the spacer 41 inserted in such a manner, the optical conductor tube of the optical conductor rod $10_2$'s side is inserted, and both of the optical conductor rods $10_1$ and $10_2$ are joined together by means of the optical jelly 40. Furthermore the flanges $14_1$ and $14_2$ are not yet connected with each other. The flange $14_1$ is moved in the direction of A and the flange $14_2$ in the direction of B, and both remain there. When the aforementioned work is done, those flanges $14_1$ and $14_2$ are not obstructions. A packing material is represented by 43, and was previously inserted into the space of one optical conductor tube's side before the connecting work was done as described above. $41a$ is a plurality of adhesive-pouring holes bored at approximately the central portion of the spacer 41. After joining the optical conductor rods $10_1$ and $10_2$ to each other as mentioned above, the optical conductor rods $10_1$ and $10_2$ and the spacer 41 are tightly fixed to each other by use of a jellified adhesive 42 poured through the adhesive pouring holes $41a$. After that, the flange $14_1$ and $14_2$ are put together and fastened by use of nuts $17_1$ and $17_2$. The connecting work for the optical conductor tube is then finished.

As is apparent from the foregoing description, it is possible to transmit light energy to a distant place by means of an optical conductor rod. However, compared with using only an optical conductor cable as was previously the case, manufacturing costs can be reduced to a great extent by using the present method. Furthermore since optical jelly having a refractive index approximately equal to that of the optical conductor rod is employed in the space between the connecting surfaces of the optical conductor rods, the light energy loss in this portion is small and the connecting surface thereof can be prevented from getting vibrations damaged through or the like. Furthermore, as the protective pipe for protecting the optical conductor rod is connected with the other protective pipe through the packing, vibrations, extension, etc. of the protective pipe, in the direction of its axis, can be absorbed by the use of the packing. It is a merit of the present invention that the contact surface of the optical conductor rod can be protected from external forces.

I claim:

1. A connecting structure for connecting vertical disposed optical conductor tubes of the type in which an optical conductor rod is disposed in a pipe, comprising a transparent spacer disposed between the longitudinal ends of two optical conductor rods of two optical conductor tubes to be joined, said transparent spacer having a diameter approximately equal to the diameter of said two optical conductor rods, said transparent spacer having an outer circumferential surface having a plurality of of spaced, arc-shaped notches, a transparent arm engaged in each of said arc-shaped notches and extending radially outwardly from said spacer, and flange support means mounted on the pipes of said two optical conductor tubes and supporting said plurality of transparent arms such that said transparent arms support said optical rods against axial displacement in their respective pipes.

2. A connecting structure according to claim 1, wherein the inner radial ends of said plurality of arms are disposed along a circle which has a diameter less than the diameter of said optical conductor rods.

3. A connecting structure according to claim 1, wherein said flange support means comprises a flange member mounted on each of said pipes of said two optical conductor tubes, and elastic packing means disposed between said two flange members, said arms being mounted by said elastic packing means.

4. A connecting structure according to claim 3, wherein the longitudinal ends of said two pipes of said two optical conductor tubes are spaced from one another, said elastic packing means extending into said space.

5. A connecting structure according to claim 1 further comprising optical paste disposed between said optical conductor rods and said spacer.

6. A connecting structure according to claim 1 further comprising optical oil disposed between said optical conductor rods and said spacer.

7. A connecting structure according to claim 1, wherein at least one of said arms has a surface formed as a reflecting mirror.

8. A connecting structure for an optical conductor tube, having an optical conductor rod inserted in a pipe, to connect it with another optical conductor tube, is characterized in that an optical jelly of a refractive index which is approximately equal to that of said optical conductor rod is placed in the space between the connecting surfaces of said optical conductor rods, and a spacer is interposed between said optical conductor rod and said pipe through the use of an optical jelly or adhesive having a refractive index smaller than that of said optical conductor rod, said pipe being connected through the means of a flange in conjunction with another flange.

9. A connecting structure for an optical conductor tube as defined in claim 8, is characterized in that said spacer has holes for pouring in the adhesive.

10. A connecting structure for an optical conductor tube as defined in claims 8 or 9, is characterized in that said flange is connected with said pipe through means of a packing which is approximately equal to that of said optical jelly.

11. A connecting structure for an optical conductor tube as defined in claims 8 or 9, is characterized in that said flange is fixed to said pipe by means of a screw and mounted thereon so as to move along the axis of said pipe.

12. A connecting structure for an optical conductor tube as defined in claims 8 or 9, is characterized in that the outer circumferential surface of said flange is constructed in the form of a hexagon.

* * * * *